United States Patent
Moganty et al.

(10) Patent No.: US 11,830,980 B2
(45) Date of Patent: Nov. 28, 2023

(54) LITHIUM ION BATTERY ELECTROLYTE ADDITIVE

(71) Applicant: NOHMS Technologies, Inc., Rochester, NY (US)

(72) Inventors: Surya S. Moganty, Henrietta, NY (US); Rutvik Vaidya, Rochester, NY (US); John Sinicropi, Rochester, NY (US); Yue Wu, West Henrietta, NY (US); Gabriel Torres, Rochester, NY (US)

(73) Assignee: NOHMS Technologies, Inc., Rochester, NY (US)

( * ) Notice: Subject to any disclaimer, the term of this patent is extended or adjusted under 35 U.S.C. 154(b) by 212 days.

(21) Appl. No.: 17/494,033

(22) Filed: Oct. 5, 2021

(65) Prior Publication Data

US 2022/0109188 A1  Apr. 7, 2022

Related U.S. Application Data (60) Provisional application No. 63/087,473, filed on Oct. 5, 2020.

(51) Int. Cl.
| | |
|---|---|
| *H01M 10/0567* | (2010.01) |
| *H01M 10/0569* | (2010.01) |
| *H01M 10/0525* | (2010.01) |
| *H01M 4/02* | (2006.01) |
| *H01M 4/525* | (2010.01) |
| *H01M 4/60* | (2006.01) |
| *H01M 4/38* | (2006.01) |
| *H01M 4/505* | (2010.01) |

(52) U.S. Cl.
CPC ... *H01M 10/0567* (2013.01); *H01M 10/0569* (2013.01); *H01M 4/386* (2013.01); *H01M 4/505* (2013.01); *H01M 4/525* (2013.01); *H01M 4/604* (2013.01); *H01M 10/0525* (2013.01); *H01M 2004/027* (2013.01); *H01M 2004/028* (2013.01)

(58) Field of Classification Search
CPC ......... H01M 10/0567; H01M 10/0569; H01M 4/386; H01M 4/505; H01M 4/525; H01M 4/604; H01M 10/0525; H01M 2004/027; H01M 2004/028
See application file for complete search history.

(56) References Cited

U.S. PATENT DOCUMENTS

| | | | | |
|---|---|---|---|---|
| 4,670,363 | A | * | 6/1987 | Whitney ........... H01M 10/0567 429/327 |
| 10,573,884 | B2 | | 2/2020 | Lee et al. |
| 10,903,521 | B2 | | 1/2021 | Moganty et al. |
| 11,063,292 | B2 | | 7/2021 | Lee et al. |
| 2018/0006294 | A1 | * | 1/2018 | Lee .................. H01M 4/133 |
| 2018/0166743 | A1 | * | 6/2018 | Lee .................. H01M 50/417 |
| 2019/0020061 | A1 | * | 1/2019 | Moganty .......... C07D 251/30 |
| 2019/0225715 | A1 | | 7/2019 | Moman et al. |

FOREIGN PATENT DOCUMENTS

| | | | | |
|---|---|---|---|---|
| CN | 108520982 | A | * | 9/2018 |
| CN | 110911735 | A | | 3/2020 |
| JP | H04233210 | | * | 8/1992 |
| KR | 20010043562 | | * | 5/2001 |
| KR | 2006/0014280 | | * | 2/2006 |
| KR | 20060014280 | | | 2/2006 |
| WO | WO 2015/058480 | | * | 4/2015 |

OTHER PUBLICATIONS

WO 2015/058480MT (Year: 2015).*
JP H04233210 (Year: 1992).*
KR 20010043562 MT (Year: 2001).*
Chervakov et al., Ionic Liquids for Promising Ion-Conducting Polymer Materials of Electrochemical Devices, Polymer Journal 30(1):5-13 (2008).
International Search Report and Written Opinion for International Patent Application PCT/US21/53475 (dated Feb. 2, 2022).

\* cited by examiner

*Primary Examiner* — Alexander Usyatinsky
(74) *Attorney, Agent, or Firm* — BOND, SCHOENECK & KING, PLLC; Joseph Noto (57) ABSTRACT

A quaternary hexahydrotriazine ionic liquid compound additive useful for reducing battery resistance and improving cycle life stability and high-temperature performance; an electrolyte containing the quaternary hexahydrotriazine ionic liquid compound additive suitable for use in electrochemical energy storage devices; and an electrochemical energy storage device incorporating the electrolyte including the quaternary hexahydrotriazine ionic liquid compound additive are described.

38 Claims, 3 Drawing Sheets

LITHIUM ION BATTERY ELECTROLYTE ADDITIVE

CROSS REFERENCE

This application claims the benefit of the filing date of U.S. Provisional Patent Application No. 63/087,473, filed Oct. 5, 2020, which is hereby incorporated by reference in its entirety.

FIELD

The present disclosure relates to a quaternary hexahydrotriazine ionic liquid compound additive useful for reducing battery resistance and improving cycle life stability and high-temperature performance; an electrolyte containing the quaternary hexahydrotriazine ionic liquid compound additive suitable for use in electrochemical energy storage devices; and an electrochemical energy storage device containing the previously-described electrolyte.

BACKGROUND

Li-ion batteries are heavily used in consumer electronics and electric vehicles (EVs), as well as in energy storage systems (ESS) and smart grids. Recently, Li-ion batteries with voltages above 4.35 V have gained importance because of higher capacity and subsequent energy density benefits. When these Li-ion batteries are exposed to extreme temperatures during their operation, the SEI (Solid Electrolyte Interface) layer formed on the anode is gradually broken down, and hence leads to more irreversible reactions resulting in capacity loss. These reactions happen on the positive and negative electrode during cycling but are generally more severe at higher voltages, particularly when batteries are operated at elevated temperatures. The next generation Li-ion batteries used in consumer electronics, EVs, and ESS will require significant improvements in the electrolyte component relative to the current state-of-the art of Li-ion batteries.

The shuttling of positive and negative ions between the battery electrodes is the main function of the electrolyte. Historically, researchers have focused on developing battery electrodes, and electrolyte development has been limited. Traditional Li-ion batteries used carbonate-based electrolytes with a large electrochemical window that can transport lithium ions. These electrolytes need functional additives to passivate the anode and form a stable SEI layer. Additionally, charging battery cathodes to higher voltages leads to increased capacity values, leading to higher energy density in battery packs and modules.

As the industry moves towards higher energy cathode materials for higher energy batteries, stable, efficient, and safe cycling of batteries in wide voltage windows is necessary. In order to achieve this, battery electrolytes use various anode SEI-forming additives based on the application in question. This tunability has enabled the development of different additives for high voltage stability and safety of Li-ion cells. Development of electrolyte additives that allow for safe operation of Li-ion cells at high voltages is critical to enable these high energy density batteries and battery packs.

Previously, triazine compounds have been added to electrolytes to remove acids and water from nonaqueous electrolytes. Hexahydrotriazine has been known as an $H_2S$ scavenger in the oil and gas industry. In theory, molecules with the same functional groups can be used as electrolyte additives allow for safe and stable operation of Li-ion cells, particularly with high voltage cathodes.

U.S. Pat. No. 7,867,294 B2 to Novolyte Technologies has reported the use of triazine compounds for removing acids and water in non-aqueous electrolytes. Chinese Patent CN103078140 B to Amperex Technology Limited has introduced the use of triazine compounds in lithium-ion secondary battery electrolytes to inhibit the oxidation reaction between electrolytes and cathode materials and to improve cycle performance under high temperature and high pressure. U.S. Patent Application No. 2019/0225815 A1 to Xerox Corporation demonstrates the use of hexahydrotriazine compounds in an electronic device to protect conductive materials.

Based on the above discussion, there is a need to develop novel molecules based on the triazine functional group to impart necessary characteristics to an electrolyte. Electrolytes with quaternary hexahydrotriazine ionic liquid compounds as described in greater detail below have high ionic conductivity and are suitable for use as electrolytes for electrochemical devices, particularly lithium-ion batteries.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended as a limitation in determining the scope of the claimed subject matter.

In some embodiments described herein, an electrolyte for an electrochemical energy storage device generally includes: a quaternary hexahydrotriazine ionic liquid compound additive; an aprotic organic solvent system; a metal salt; and at least one additional additive.

In some embodiments described herein, an electrolyte for an electrochemical energy storage device generally includes: a quaternary hexahydrotriazine ionic liquid compound additive; an aprotic organic solvent system; a metal salt; and at least one additional additive, wherein the hexahydrotriazine ionic liquid compound is a substituted triazine molecule.

In some embodiments described herein, an electrolyte for an electrochemical energy storage device generally includes: a quaternary hexahydrotriazine ionic liquid compound additive; an aprotic organic solvent system; a metal salt; and at least one additional additive; wherein the aprotic organic solvent is an open-chain or cyclic carbonate, a carboxylic acid ester, a nitrite, an ether, a sulfone, a sulfoxide, a ketone, a lactone, a dioxolane, a glyme, a crown ether, a siloxane, a phosphoric acid ester, a phosphite, a mono- or polyphosphazene, or any mixture thereof.

In some embodiments described herein, an electrolyte for an electrochemical energy storage device generally includes: a quaternary hexahydrotriazine ionic liquid compound additive; an aprotic organic solvent; a metal salt; and at least one additional additive; wherein a cation component of the metal salt is aluminum, magnesium or an alkali metal, such as lithium or sodium.

In embodiments described herein, an electrolyte for an electrochemical energy storage device generally includes: a quaternary hexahydrotriazine ionic liquid compound additive; an aprotic organic solvent; a metal salt; and at least one additional additive; wherein the additional additive contains a compound containing at least one unsaturated carbon-carbon bond, a carboxylic acid anhydride, a sulfur-containing compound, a phosphorus-containing compound, a boron-containing compound, a silicon-containing compound, or any mixture thereof.

These and other aspects of the technology described herein will be apparent after consideration of the Detailed Description and Figures herein. It is to be understood, however, that the scope of the claimed subject matter shall be determined by the claims as issued and not by whether given subject matter addresses any or all issues noted in the Background or includes any features or aspects recited in the Summary.

BRIEF DESCRIPTION OF DRAWINGS

Non-limiting and non-exhaustive embodiments of the disclosed technology, including preferred embodiments, are described with reference to the following figures, wherein like reference numerals refer to like parts throughout the various views unless otherwise specified.

DETAILED DESCRIPTION

Embodiments are described more fully below with reference to the accompanying Figures, which form a part hereof and show, by way of illustration, specific exemplary embodiments. These embodiments are disclosed in sufficient detail to enable those skilled in the art to practice the claimed subject matter. However, embodiments may be implemented in many different forms and should not be construed as being limited to the embodiments set forth herein. The following detailed description is, therefore, not to be taken in a limiting sense.

The disclosed technology relates generally to lithium-ion (Li-ion) battery electrolytes. Particularly, the disclosure is directed towards quaternary hexahydrotriazine ionic liquid compound additives, electrolytes containing these additive materials, and electrochemical energy storage devices containing the electrolytes.

The present disclosure describes a Li-ion battery electrolyte with an electrolyte additive that can improve the high voltage stability challenges in Li-ion batteries. Embodiments of the electrolyte compositions described herein are directed towards providing a solution for cycling of Li-ion cells with high voltage cathodes at different temperatures. The disclosed technology is based on employing quaternary hexahydrotriazine ionic liquid compounds as electrolyte additives that can improve the stability of high-voltage cathodes during operation in a wide temperature range. The electrolyte additives form a unique solid electrolyte interface (SEI) when used at low weight loadings and enhance the cycle life characteristics of high voltage cells.

In some embodiments, an electrochemical energy storage device electrolyte includes a) an aprotic organic solvent system; b) a metal salt; c) a quaternary hexahydrotriazine ionic liquid compound additive material; and d) at least one additional additive.

In some embodiments, the molecular structure of the quaternary hexahydrotriazine ionic liquid compound additive is depicted by the formula below:

wherein:

$R_1$, $R_2$ and $R_3$ are independently $C_1$-$C_{12}$ substituted or unsubstituted alkyl groups, or $C_6$-$C_{14}$ aryl groups; wherein any hydrogen atom in these groups can be unsubstituted or can be any one of a halogen, an alkyl, an alkoxy, a perfluorinated alkyl, a silyl, a siloxy, a silane, a sulfoxide, an amide, an azo, an ether, or a thioether group;

L is independently selected from hydrogen, a $C_1$-$C_{12}$ alkyl, an alkenyl, an alkoxy, an aryl, an alkynyl, an alkylsiloxy, an alkylhalide, a silyl, an ester, a carbonyl, a phenyl, or a perfluoro group; and $X^-$ represents an anion of the ionic liquid compound selected from a halide, an aluminate, an arsenide, a cyanide, a thiocyanate, a nitrile, a benzoate, a chlorate, a chlorite, a chromate, a sulfate, a sulfite, a silicate, a thiosulfate, an oxalate, an acetate, a formate, a hydroxide, a nitrate, a phosphate, an imide, a borate or a phosphazine.

In some embodiments when L is methyl and X is $TFSI^-$, $R_1$, $R_2$ and $R_3$ can each individually be any of the following functional groups:

1,3,5-Triazinane(13TMS-TFSI)3:

1,3,5-Triazinane(13TMOS-TFSI)3:

1,3,5-Triazinane(13TEOS-TFSI)3:

1,3,5-Triazinane(1propargyl-TFSI)3:

1,3,5-Triazinane(1allyl-TFSI)3:

1,3,5-Triazinane(1vinyl-TFSI)3:

1,3,5-Triazinane(13styrenyl-TFSI)3:

1,3,5-Triazinane(13p-fluorophenyl-TFSI)3:

1,3,5-Triazinane(13p-cyanophenyl-TFSI)3:

1,3,5-Triazinane(13CF$_3$-TFSI)3:

1,3,5-Triazinane(13Glycidyl-TFSI)3:

Non-limiting examples of specific hexahydrodriazine ionic liquid compound additives include 1,3,5-Triazinane (13TMS-TFSI)3; 1,3,5-Triazinane(13TMOS-TFSI)3; 1,3,5-Triazinane(13TEOS-TFSI)3; 1,3,5-Triazinane(1propargyl-TFSI)3; 1,3,5-Triazinane(1allyl-TFSI)3; 1,3,5-Triazinane (13p-fluorophenyl-TFSI)3; 1,3,5-Triazinane(13p-cyanophenyl-TFSI)3; 1,3,5-Triazinane(13CF$_3$-TFSI)3; and 1,3,5-Triazinane(13Glycidyl-TFSI)3.

By adding hexahydrodriazine ionic liquid compound additive to the electrolyte used in a Li-ion battery system, a stable silicon-containing film or layer may be formed more easily on the electrode materials. Quaternary hexahydrotriazine based ionic liquid compound additives can improve the performance of conventional electrolytes by facilitating the decomposition of additives. Additionally, multiple functional groups attached to the core structure of the hexahydrodriazine ionic liquid compound also impart other properties beneficial to lithium-ion battery electrolytes.

In some embodiments, the hexahydrodriazine ionic liquid compound additive may be present in the electrolyte in the range of from about 0.01 wt. % to about 10 wt. % by weight.

Methods for synthesizing the quaternary hexahydrotriazine ionic liquid compounds, and the use of such molecules in lithium-ion battery electrolytes, are also described herein. Due to a more robust SEI film formed on the electrodes, the additive molecules impart greater stability to the electrolytes at higher operating voltages in a wide temperature window.

In some embodiments, the electrolyte further includes a metal salt, such as a lithium salt. The metal salt may be present in the electrolyte in a range of from about 10% to about 30% by weight. When a lithium salt is used as the metal salt, a variety of lithium salts may be used, including (but not limited to), Li(AsF$_6$); Li(PF$_6$); Li(CF$_3$CO$_2$); Li(C$_2$F$_5$CO$_2$); Li(CF$_3$SO$_3$); Li[N(CP$_3$SO$_2$)$_2$]; Li[C(CF$_3$SO$_2$)$_3$]; Li[N(SO$_2$C$_2$F$_5$)$_2$]; Li(ClO$_4$); Li(BF$_4$); Li(PO$_2$F$_2$); Li[PF$_2$(C$_2$O$_4$)$_2$]; Li[PF$_4$C$_2$O$_4$]; lithium alkyl fluorophosphates; Li[B(C$_2$O$_4$)$_2$]; Li[BF$_2$C$_2$O$_4$]; Li$_2$[B$_{12}$Z$_{12-j}$H$_j$]; or a mixture of any two or more thereof, wherein Z is independently at each occurrence a halogen, and j is an integer from 0 to 12.

In some embodiments, the electrolyte further includes an aprotic organic solvent system. The aprotic solvent system may be selected from an open-chain or cyclic carbonate, a carboxylic acid ester, a nitrite, an ether, a sulfone, a sulfoxide, a ketone, a lactone, a dioxolane, a glyme, a crown ether, a siloxane, a phosphoric acid ester, a phosphite, a mono- or polyphosphazene, or any mixtures thereof. In some embodiments, the aprotic organic solvent system is present in the electrolyte in a range of from about 60% to about 90% by weight.

Specific examples of suitable aprotic solvents for generating electrolytes include but are not limited to dimethyl carbonate, ethyl methyl carbonate, diethyl carbonate, methyl propyl carbonate, ethyl propyl carbonate, dipropyl carbonate, propylene carbonate, ethylene carbonate, fluoroethylene carbonate, bis(trifluoroethyl) carbonate, bis(pentafluoropropyl) carbonate, trifluoroethyl methyl carbonate, pentafluoroethyl methyl carbonate, heptafluoropropyl methyl carbonate, perfluorobutyl methyl carbonate, trifluoroethyl ethyl carbonate, pentafluoroethyl ethyl carbonate, heptafluoropropyl ethyl carbonate, perfluorobutyl ethyl carbonate, etc., fluorinated oligomers, methyl propionate, ethyl propionate, butyl propionate, dimethoxyethane, triglyme, dimethylvinylene carbonate, tetraethyleneglycol, dimethyl ether, polyethylene glycols, triphenyl phosphate, tributyl phosphate, hexafluorocyclotriphosphazene, 2-Ethoxy-2,4,4,6,6-pentafluoro-1,3,5,2-5,4-5,6-5 triazatriphosphinine, triphenyl phosphite, sulfolane, dimethyl sulfoxide, ethyl methyl sulfone, ethylvinyl sulfone, allyl methyl sulfone, divinyl sulfone, fluorophynelmethyl sulfone and gamma-butyrolactone.

In some embodiments, the electrolyte further includes at least one additional additive configured to protect the electrodes and electrolyte from degradation. Thus, electrolytes of the present technology may include an additive that is reduced or polymerized on the surface of an electrode to form a passivation film. In some embodiments, the electrolyte as described herein includes mixtures of two or more types of the additional additive (i.e., two or more additives that are configured to protect the electrode and electrolyte from degradation).

In some embodiments, the additional additive is a substituted or unsubstituted linear, branched, or cyclic hydrocarbon including at least one oxygen atom and at least one aryl, an alkenyl group or an alkynyl group. The passivating film formed from such additives may also be formed from a substituted aryl compound or a substituted or unsubstituted heteroaryl compound where the additive includes at least one oxygen atom.

Specific examples of suitable additional additives include, but are not limited to, glyoxal bis(diallyl acetal), tetra (ethylene glycol) divinyl ether, 1,3,5-triallyl-1,3,5-triazine-2,4,6(1H,3H,5H)-trione, 1,3,5,7-tetravinyl-1,3,5,7-tetramethylcyclotetrasiloxane, 2,4,6-triallyloxy-1,3,5-triazine, 1,3,5-triacryloylhexahydro-1,3,5-triazine, 1,2-divinyl furoate, 1,3-butadiene carbonate, 1-vinylazetidin-2-one, 1-vinylaziridin-2-one, 1-vinylpiperidin-2-one, 1 vinylpyrrolidin-2-one, 2,4-divinyl-1,3-dioxane, 2-amino-3-vinylcyclohexanone, 2-amino-3-vinylcyclopropanone, 2 amino-4-vinylcyclobutanone, 2-amino-5-vinylcyclopentanone, 2-aryloxy-cyclopropanone, 2-vinyl-[1,2]oxazetidine, 2 vinylaminocyclohexanol, 2-vinylaminocyclopropanone, 2-vinyloxetane, 2-vinyloxy-cyclopropanone, 3-(N-vinylamino)cyclohexanone, 3,5-divinyl furoate, 3-vinylazetidin-2-one, 3 vinylaziridin-2-one, 3-vinylcyclobutanone, 3-vinylcyclopentanone, 3-vinyloxaziridine, 3-vinyloxetane, 3-vinylpyrrolidin-2-one, 2-vinyl-1,3-dioxolane, acrolein diethyl acetal, acrolein dimethyl acetal, 4,4-divinyl-3-dioxolan-2-one, 4-vinyltetrahydropyran, 5-vinylpiperidin-3-one, allylglycidyl ether, butadiene monoxide, butyl-vinyl-ether, dihydropyran-3-one, divinyl butyl carbonate, divinyl carbonate, divinyl crotonate, divinyl ether, divinyl ethylene carbonate, divinyl ethylene silicate, divinyl ethylene sulfate, divinyl ethylene sulfite, divinyl methoxypyrazine, divinyl methylphosphate, divinyl propylene carbonate, ethyl phosphate, methoxy-o-terphenyl, methyl phosphate, oxetan-2-yl-vinylamine, oxiranylvinylamine, vinyl carbonate, vinyl crotonate, vinyl cyclopentanone, vinyl ethyl-2-furoate, vinyl ethylene carbonate, vinyl ethylene silicate, vinyl ethylene sulfate, vinyl ethylene sulfite, vinyl methacrylate, vinyl phosphate, vinyl-2-furoate, vinylcylopropanone, vinylethylene oxide, β-vinyl-γ-butyrolactone or a mixture of any two or more thereof.

In some embodiments, the additional additive may be a cyclotriphosphazene that is substituted with F, an alkyloxy, an alkenyloxy, an aryloxy, a methoxy, allyloxy groups or any combination thereof. For example, the additional additive may be a (divinyl)-(methoxy)(trifluoro)cyclotriphosphazene, (trivinyl)(difluoro)(methoxy)cyclotriphosphazene, (vinyl)(methoxy)(tetrafluoro)cyclotriphosphazene, (aryloxy)(tetrafluoro)(methoxy)cyclotriphosphazene or (diaryloxy)(trifluoro)(methoxy)cyclotriphosphazene compounds or a mixture of two or more such compounds.

In some embodiments, the additional additive may be a sulfur-containing compound, a phosphorus-containing compound, a boron-containing compound, a silicon-containing compound, a fluorine-containing compound, a nitrogen-containing compound, a compound containing at least one unsaturated carbon-carbon bond, a carboxylic acid anhydride, or any mixture thereof. In some embodiments, the additional additive is a vinyl carbonate, a fluoroethyl carbonate, a vinyl ethylene carbonate, or any mixture thereof.

In some embodiments, the additional additive is a fully or partially halogenated phosphoric acid ester compound, an ionic liquid, or mixtures thereof. The halogenated phosphoric acid ester may include 4-fluorophenyldiphenylphosphate, 3,5-difluorophenyldiphenylphosphate, 4-chlorophenyldiphenylphosphate, trifluorophenylphosphtate, heptafluorobutyldiphenylphosphate, trifluoroethyldiphenylphosphate, bistrifluoroethylphenyl phosphate, phenylbis (trifluoroethyl)phosphate. The ionic liquids may include tris(N-ethyl-N-methylpyrrolidinium)thiophosphate bis(trifluoromethylsulfonyl)imide, tris(N-ethyl-N-methylpyrrolidinium) phosphate bis(trifluoromethylsulfonyl)imide, tris (N-ethyl-N-methylpiperidinium)thiophosphate bis (trifluoromethylsulfonyl)imide, tris(N-ethyl-N-methylpiperidinium)phosphate bis(trifluoromethylsulfonyl) imide, N-methyl-trimethylsilylpyrrolidinium bis (trifluoromethylsulfonyl)imide, or N-methyl-trimethylsilylpyrrolidinium hexafluorophosphate.

Regardless of the specific additional additive or combination of additional additives used, the additional additive may be present in the electrolyte in a range of from about 0.01% to about 10% by weight.

In another embodiment of the technology described herein, an electrochemical energy storage device is provided that generally includes a cathode, an anode, and an electrolyte including a quaternary hexahydrotriazine ionic liquid compound additive as described herein. In some embodiments, the electrochemical energy storage device is a secondary battery. In some embodiments, the secondary battery is a lithium battery, a lithium-ion battery, a lithium-sulfur battery, a lithium-air battery, a sodium ion battery, or a magnesium battery. In some embodiments, the electrochemical energy storage device is an electrochemical cell, such as a capacitor. In some embodiments, the capacitor is an asymmetric capacitor or supercapacitor. In some embodiments, the electrochemical cell is a primary cell. In some embodiments, the primary cell is a lithium/$MnO_2$ battery or Li/poly (carbon monofluoride) battery.

In some embodiments, a secondary battery is provided including a positive and a negative electrode separated from each other using a porous separator and the electrolyte as described herein.

Suitable materials for the cathode used in the electrochemical storage device described herein include, but are not limited to, lithium metal oxide, spinel, olivine, carbon-coated olivine, $LiFePO_4$, $LiCoO_2$, $LiNiO_2$, $LiMn_{0.5}Ni_{0.5}O_2$, $LiMn_{0.33}Co_{0.33}Ni_{0.33}O_2$, $LiMn_2O_4$, $LiFeO_2$, $LiNi_xCo_yMet_zO_2$, $An'B_2(XO_4)_3$ (NASICON), vanadium oxide, lithium peroxide, sulfur, polysulfide, a lithium carbon monofluoride (also known as LiCFx) or mixtures of any two or more thereof, where Met is Al, Mg, Ti, B, Ga, Si, Mn or Co; A is Li, Ag, Cu, Na, Mn, Fe, Co, Ni, Cu or Zn; B is Ti, V, Cr, Fe or Zr; X is P, S, Si, W or Mo; and wherein $0 \leq x \leq 0.3$, $0 \leq y \leq 0.5$, and $0 \leq z \leq 0.5$ and $0 \leq n^1 \leq 0.3$. In embodiments where the cathode comprises spinel, the spinel may be a spinel manganese oxide with the formula of $Li1+xMn2-zMet'''yO4-mX'n$, wherein Met''' is Al, Mg, Ti, B, Ga, Si, Ni or Co; X' is S or F; and wherein $0 \leq x \leq 0.3$, $0 \leq y \leq 0.5$, $0 \leq z \leq 0.5$, $0 \leq m \leq 0.5$ and $0 \leq n \leq 0.5$. In embodiments where the cathode comprises olivine, the olivine may have the formula of $Li_{1-x}Fe_{1z}$ Met''$_y$PO$_4$−mX'n, wherein Met'' is Al, Mg, Ti, B, Ga, Si, Ni, Mn or Co; X' is S or F; and wherein $0 \leq x \leq 0.3$, $0 \leq y \leq 0.5$, $0 \leq z \leq 0.5$, $0 \leq m \leq 0.5$ and $0 \leq n \leq 0.5$.

Suitable materials for the anode used in the electrochemical storage device described herein include, but are not limited to, lithium metal, graphitic materials, amorphous carbon, carbon nanotubes, $Li_4Ti_5Oi_2$, tin alloys, silicon, silicon alloys, intermetallic compounds, or mixtures of any two or more such materials. In embodiments where the anode comprises graphite, suitable graphitic materials include natural graphite, artificial graphite, graphitized meso-carbon microbeads (MCMB) and graphite fibers, as well as any amorphous carbon materials.

In some embodiments, the anode is a composite anode comprising active materials such as silicon and silicon alloys, and a conductive polymer coating around the active material. The active material may be in the form of silicon particles having a particle size of between about 1 nm and about 100 μm. Other suitable active materials include but are not limited to hard-carbon, graphite, tin, and germanium particles. The polymer coating material can be cyclized using heat treatment at temperatures of from 200° C. to 400° C. to thereby convert the polymer to a ladder compound by crosslinking polymer chains. Specific polymers that can be used include but are not limited to polyacrylonitrile (PAN) where the cyclization changes the nitrile bond (C≡N) to a double bond (C═N). The polymer material forms elastic but robust films to allow for controlled fragmentation/pulverization of silicon particles within the polymer matrix. Additionally, the PAN matrix also provides a path for Li-ion mobility thus enhancing the conductivity of the composite anode. The resultant anode material can overcome expansion and conductivity challenges of silicon-based anodes, such as by providing binders that can prevent expansion of silicon particles and conductive additives to provide a path for Li-ion mobility. In some embodiments, the polymer is about 10 wt. % to 40 wt. % of the anode composite material. Additional description of these Si-PAN composite anodes is provided in U.S. Pat. Nos. 10,573,884 and 10,707,481, both of which are hereby incorporated by reference in their entirety.

In some embodiments, the anode and cathode electrodes are separated from each other by a porous separator. The separator may be a microporous polymer film. Non-limiting examples of suitable polymers for forming films to serve as the separator include polypropylene, polyethylene, nylon, cellulose, nitrocellulose, polysulfone, polyacrylonitrile, polyvinylidene fluoride, polybutene, or copolymers or blends of any two or more such polymers. In some embodiments, the separator is an electron beam-treated microporous polyolefin separator. The electron treatment can increase the deformation temperature of the separator and can accordingly enhance thermal stability at high temperatures. Additionally, or alternatively, the separator can be a shut-down separator. The shut-down separator can have a trigger temperature above about 130° C. to permit the electrochemical cells to operate at temperatures up to about 130° C.

EXAMPLES

Example A—Synthesis of 1,3,5-Triazinane(13TEOS-TFSI)3

Step 1: Synthesis of Hexahydro-1,3,5-tri-ethoxysilylpropyl-1,3,5-triazine

A 250 mL round bottom flask equipped with a magnetic stirrer was charged with 3-Triethoxysilylpropylamine followed by 70 mL toluene. To the stirred solution, 2.7 g paraformaldehyde was added and rinsed in with 10 mL toluene. The stirred mixture was then heated to reflux, into a dean stark trap.

The slurry was refluxed for about 15 min, at which time all the solids were in solution. Reflux into the dean stark trap continued for an additional 2 h removing about 20 mL toluene during the reaction. After 1 h about 1.5 mL water had been removed. After about 70 min, TLC (Ethyl Acetate 40/Hexanes 60) showed faint starting material and one major new spot (visualized with Iodine chamber). Reflux continued for an additional 15 min, then the slurry was let to cool to 11° C. in an ice/water bath. No solid formed as in the fluorophenyl variation. Toluene was removed on the roto evaporator under reduced pressure. A very small amount of a white solid appeared in the clear oil that was obtained, and this was filtered away through a 0.45-micron membrane. 19.8 g of product was obtained.

Step 2: Synthesis of Hexahydro-1,3,5 tri-N-Methyl-Propyl-Si-Ethoxy-1,3,5-triazine iodide The 1,3,5-triazine prepared in Step 1 was added to a 100 mL RBF, followed by 100 mL DCM, and magnetically stirred. To the clear stirred solution, 3.0 g iodomethane was added. A slight exotherm occurred after addition.

After stirring for 3 days TLC (Ethyl Acetate 40/Hexanes 60) showed no starting material and one new spot at the origin. The mixtures were concentrated to dryness and carried on without further purification to the next step.

Step 3: Synthesis of
1,3,5-Triazinane(13TEOS-TFSI)3

The triazine iodide prepared from Step 2 was concentrated to dryness. The yellow oil was stirred in 25 mL water and treated in one portion with 8.9 g of LiTFSI (80% solution in water). A cloudy material immediately oiled out of solution. The mixture was stirred for 30 min, then 40 mL DCM was added. The organic phase was extracted into DCM, transferred to a separatory funnel. The organic phase was collected, dried with $MgSO_4$, and concentrated to slightly yellow oil. 7.9 grams of desired product over three steps was collected.

Example B—Electrolyte Formulations

Electrolyte formulations were prepared in a dry argon filled glovebox by combining all electrolyte components in glass vials by stirring for 24 hours to ensure complete dissolution of the salts. The quaternary hexahydrotriazine ionic liquid compound additive materials are added to a base electrolyte formulation comprising lithium hexafluorophosphate ($LiPF_6$) as a $Li^+$ ion conducting salt dissolved in a mixture of carbonate solvents (EC and EMC). Vinylene carbonate (VC) and fluoroethylene carbonate (FEC) are used as standard anode SEI forming additives. The electrolyte formulations are listed in Table A.

TABLE A

Electrolyte Formulations

| Electrolyte | Base Formulation | Additive Weight (%) |
|---|---|---|
| Comparative Example 1 (CE1) | 1.0M $LiPF_6$ in EC:EMC (3:7) | VC: 1%, FEC: 1% |
| Embodiment Example 1 (EE1) | 1.0M $LiPF_6$ in EC:EMC (3:7) | VC: 1%, FEC: 1%, Tris(1,3-TEOS)Triazine TFSI: 1% |

Example C—Li-Ion Cell Data

Figure 1:
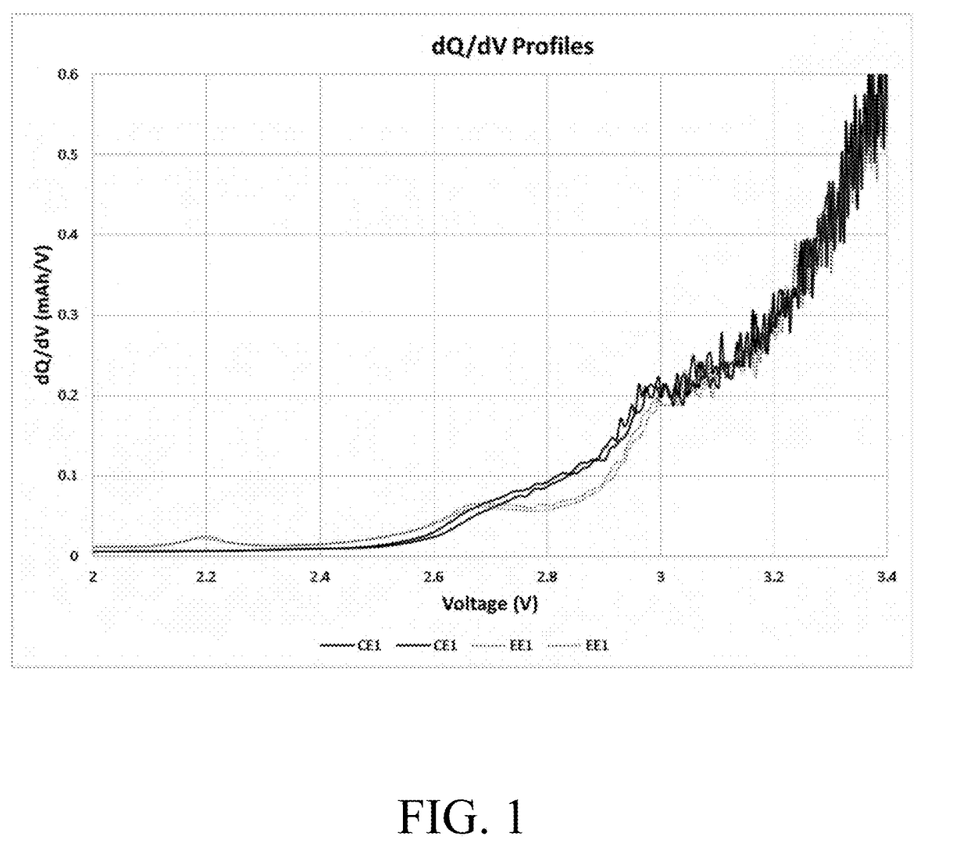
FIG. 1 shows the dQ/dV profiles of electrolytes configured in accordance with various embodiments described herein tested in 200 mAh NMC622-Gr cells.

The electrolyte formulations prepared in Example B are used as electrolytes in 200 mAh Li-ion pouch cells comprising lithium nickel manganese cobalt oxide (NMC622) cathode active material and graphite as the anode active material. In each cell, 0.9 mL of electrolyte formulation was added and allowed to soak in the cell for 1 hour. The cells are vacuum sealed, and primary charged to 1.0 V before wetting at 25° C. for 10 hours. The cells were then charged to 3.8 V at C/25 rate before degassing, followed by vacuum sealing. After degassing, the cells were charged and discharged twice between 4.45 to 3.0 V at C/10 rate, and the results are summarized in Table B. The first CE is calculated during the first formation cycle, and the reported discharge capacity is for the last cycle of formation at C/5 rate. AC-IR is the measured internal resistance at 1 kHz frequency. It is evident that the addition of 1 wt. % quaternary hexahydrotriazine ionic liquid compound increases the AC-IR, and hence reduced the initial discharge capacity compared to Comparative Example 1. However, the dQ/dV profiles in FIG. 1 are indicative of a different unique SEI layer on the anode surface compared to the Comparative Example 1, as confirmed by the peaks at ~2.2 V.

TABLE B

Initial Cell Data

| Electrolyte | $1^{st}$ CE (%) | Discharge Capacity (mAh) | AC-IR (mΩ) |
| --- | --- | --- | --- |
| CE1 | 87.4 | 203.5 | 97.5 |
| EE1 | 86.3 | 197.9 | 100.6 |

Figure 2:
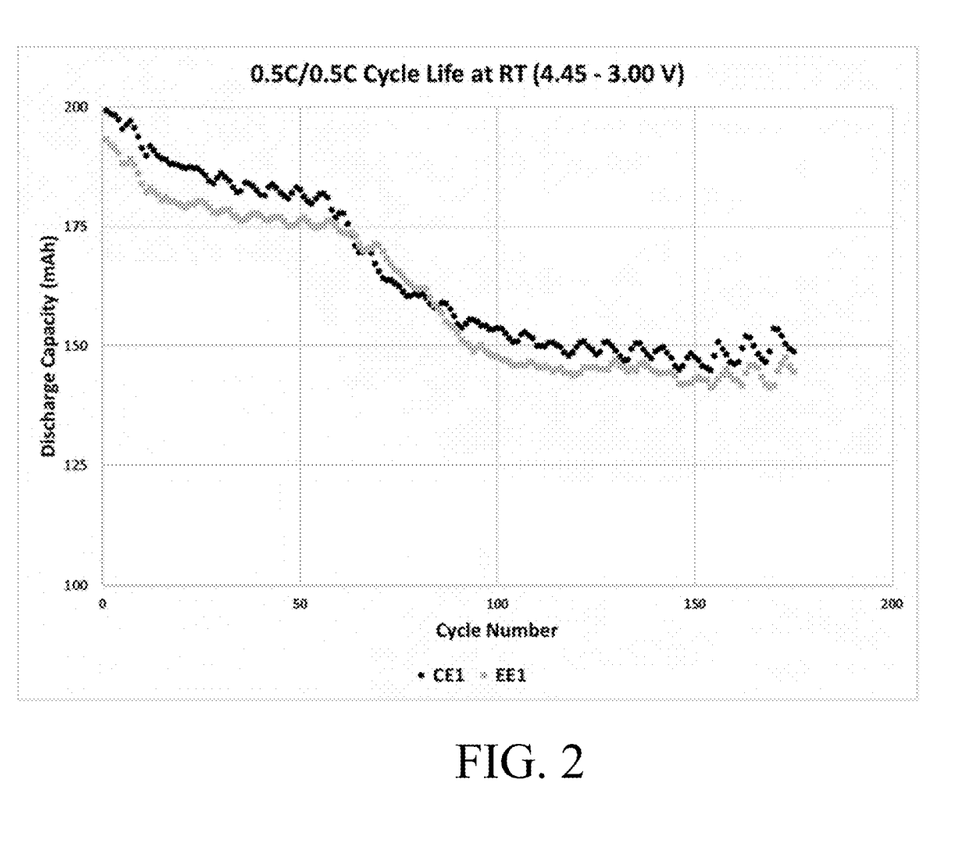
FIG. 2 shows the cycle life characteristics at room temperature (RT) for cells with electrolytes configured in accordance with various embodiments described herein tested in 200 mAh NMC622-Gr cells.
Figure 3:
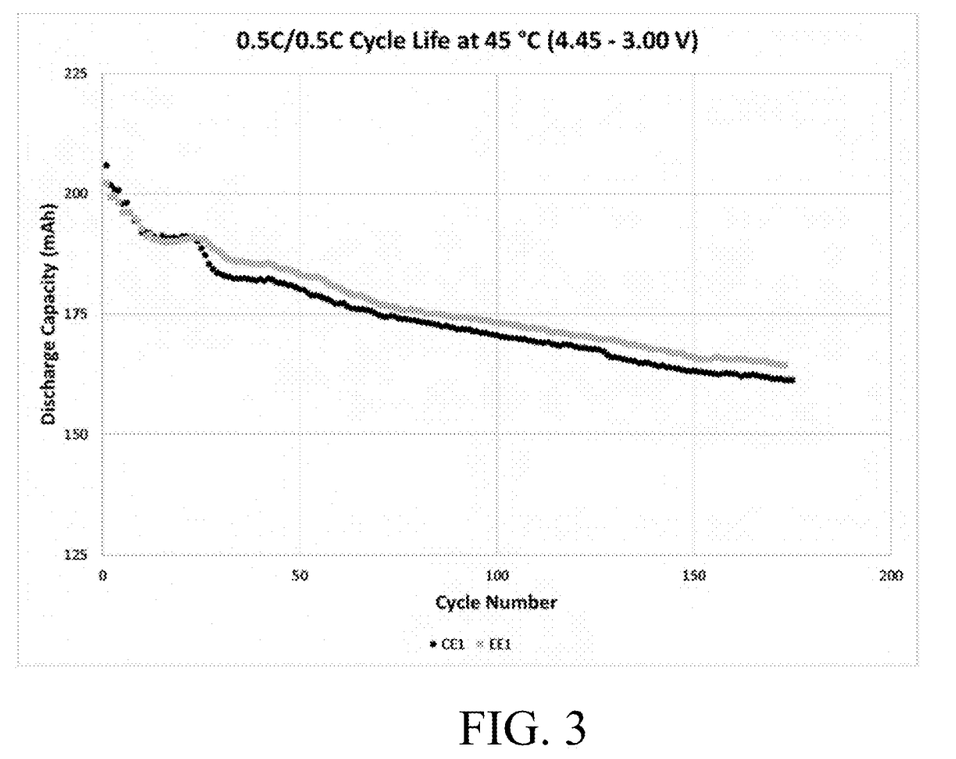
FIG. 3 shows the cycle life characteristics at 45° C. for cells with electrolytes configured in accordance with various embodiments described herein tested in 200 mAh NMC622-Gr cells.

The cycle life characteristics are tested at 0.5 C charging and discharging rate in the voltage range of 4.45-3.0 V. In the cycle life plots in FIGS. 2 and 3, cells with quaternary hexahydrotriazine ionic compound additive perform better at room temperature and 45° C., compared to commercial examples. At higher temperature especially, cells with CE1 experience fast capacity fade, but cells with EE1 show stable cycle life characteristics. The capacity retention data after 150 cycles can be seen in Table C.

TABLE C

Capacity Retention Data after 150 cycles

| | Temperature | |
| --- | --- | --- |
| Electrolyte | RT | 45° C. |
| CE1 | 74.1 | 79.3 |
| EE1 | 75.3 | 82.1 |

From the foregoing, it will be appreciated that specific embodiments of the disclosure have been described herein for purposes of illustration, but that various modifications may be made without deviating from the scope of the disclosure. Accordingly, the scope of the subject matter is not limited except as by the appended claims.

Although the technology has been described in language that is specific to certain structures and materials, it is to be understood that the subject matter defined in the appended claims is not necessarily limited to the specific structures and materials described. Rather, the specific aspects are described as forms of implementing the claimed subject matter. Because many embodiments of the subject matter can be practiced without departing from the spirit and scope of the subject matter, the scope of the claimed subject matter resides in the claims hereinafter appended.

Unless otherwise indicated, all number or expressions, such as those expressing dimensions, physical characteristics, etc., used in the specification (other than the claims) are understood as modified in all instances by the term "approximately". At the very least, and not as an attempt to limit the application of the doctrine of equivalents to the claims, each numerical parameter recited in the specification or claims which is modified by the term "approximately" should at least be construed in light of the number of recited significant digits and by applying rounding techniques. Moreover, all ranges disclosed herein are to be understood to encompass and provide support for claims that recite any and all sub-ranges or any and all individual values subsumed therein. For example, a stated range of 1 to 10 should be considered to include and provide support for claims that recite any and all sub-ranges or individual values that are between and/or inclusive of the minimum value of 1 and the maximum value of 10; that is, all sub-ranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. An electrochemical energy storage device electrolyte comprising:
   an aprotic organic solvent system;
   a metal salt; and
   at least one quaternary hexahydrotriazine ionic liquid compound additive according to the formula:

wherein:
   $R_1$, $R_2$ and $R_3$ are independently $C_1$-$C_{12}$ substituted or unsubstituted alkyl groups, or $C_6$-$C_{14}$ aryl groups; wherein at least one of the hydrogen atoms is independently substituted with either a halogen, a perfluorinated alkyl, a silyl, a siloxy, a silane, a sulfoxide, an amide, an azo, an ether, or a thioether group;
   L is independently selected from hydrogen, a $C_1$-$C_{12}$ alkyl, an alkenyl, an alkoxy, a $C_6$-$C_{14}$ aryl, an alkynyl, an alkylsiloxy, an alkylhalide, a silyl, an ester, a carbonyl, or a perfluoro group; and
   X⁻ is an anion of the ionic liquid compound selected from a halide, an aluminate, an arsenide, a cyanide, a thiocyanate, a nitrile, a benzoate, a chlorate, a chlorite, a chromate, a sulfate, a sulfite, a silicate, a thiosulfate, an oxalate, an acetate, a formate, a hydroxide, a nitrate, a phosphate, an imide, a borate or a phosphazine.

2. The electrolyte of claim 1, wherein the at least one quaternary hexahydrotriazine ionic liquid compound additive is selected from the group consisting of 1,3,5-Triazinane (13TMS-TFSI)3; 1,3,5-Triazinane(13TMOS-TFSI)3; 1,3,5-Triazinane(13TEOS-TFSI)3; 1,3,5-Triazinane(1 propargyl-TFSI)3; 1,3,5-Triazinane(1 allyl-TFSI)3; 1,3,5-Triazinane (13p-fluorophenyl-TFSI)3; 1,3,5-Triazinane(13p-cyanophenyl-TFSI)3; 1,3,5-Triazinane(13CF₃-TFSI)3; and 1,3,5-Triazinane(13Glycidyl-TFSI)3.

3. The electrolyte of claim 1, wherein the at least one quaternary hexahydrotriazine ionic liquid compound additive is present in the electrolyte in a range of from 0.01 wt. % to 10 wt. % of the electrolyte.

4. The electrolyte of claim 1, wherein the aprotic organic solvent system comprises an open-chain or cyclic carbonate, a carboxylic acid ester, a nitrile, an ether, a sulfone, a ketone, a lactone, a dioxolane, a glyme, a crown ether, a siloxane, a phosphoric acid ester, a phosphite, a mono- or polyphosphazene, or any mixtures thereof.

5. The electrolyte of claim 1, wherein the aprotic organic solvent system is present in the electrolyte in a range of from 60 wt. % to 90 wt. % of the electrolyte.

6. The electrolyte of claim 1, wherein a cation component of the metal salt is an alkali metal.

7. The electrolyte of claim 6, wherein the alkali metal is lithium or sodium.

8. The electrolyte of claim 1, wherein a cation component of the metal salt is aluminum or magnesium.

9. The electrolyte of claim 1, wherein the metal salt is present in the electrolyte in a range of from 10 wt. % to 30 wt. % of the electrolyte.

10. The electrolyte of claim 1, further comprising at least one second additive.

11. The electrolyte of claim 10, wherein the second additive comprises a sulfur-containing compound, a phosphorus-containing compound, a boron-containing compound, a silicon-containing compound, a fluorine-containing compound, a nitrogen-containing compound, a compound containing at least one unsaturated carbon-carbon bond, a carboxylic acid anhydride, or any mixtures thereof.

12. The electrolyte of claim 10, wherein the second additive comprises a partially or fully halogenated phosphoric acid ester compound, an ionic liquid, or mixtures thereof.

13. The electrolyte of claim 12, wherein the second additive comprises a halogenated phosphoric acid ester compound and the halogenated phosphoric acid ester compound is 4-fluorophenyldiphenylphosphate, 3,5-difluorophenyldiphenylphosphate, 4-chlorophenyldiphenylphosphate, trifluorophenylphosphate, heptafluorobutyldiphenylphosphate, trifluoroethyldiphenylphosphate, bistrifluoroethylphenyl phosphate, or phenylbis(trifluoroethyl)phosphate.

14. The electrolyte of claim 12, wherein the second additive comprises an ionic liquid and the ionic liquid is tris(N-ethyl-N-methylpyrrolidinium)thiophosphate bis(trifluoromethylsulfonyl)imide, tris(N-ethyl-N-methylpyrrolidinium) phosphate bis(trifluoromethylsulfonyl)imide, tris(N-ethyl-N-methylpiperidinium)thiophosphate bis(trifluoromethylsulfonyl)imide, or tris(N-ethyl-N-methylpiperidinium)phosphate bis(trifluoromethylsulfonyl)imide.

15. The electrolyte of claim 10, wherein the second additive is present in the electrolyte in a range of from 0.01 wt. % to 10 wt. % of the electrolyte.

16. An electrochemical energy storage device comprising:
a cathode;
an anode;
an electrolyte according to claim 1; and
a separator.

17. The device of claim 16, wherein the cathode comprises a lithium metal oxide, a spinel, an olivine, a carbon-coated olivine, a vanadium oxide, a lithium peroxide, sulfur, a polysulfide, a lithium carbon monofluoride, or mixtures of any two or more thereof.

18. The device of claim 17, wherein the cathode comprises a lithium metal oxide and the lithium metal oxide is $LiCoO_2$, $LiNiO_2$, $LiNi_xCo_yMet_zO_2$, $LiMn_{0.5}Ni_{0.5}O_2$, $LiMn_{0.1}Co_{0.1}Ni_{0.8}O_2$, $LiMn_{0.2}Co_{0.2}Ni_{0.6}O_2$, $LiMn_{0.3}Co_{0.2}Ni_{0.5}O_2$, $LiMn_{0.33}Co_{0.33}Ni_{0.33}O_2$, $LiMn_2O_4$, $LiFeO_2$, $Li_{1+x'}Ni_\alpha Mn_\beta Co_\gamma Met'_\delta O_{2-z}F_{z'}$, or $A_{n'}B_2(XO_4)_3$ (NASICON), wherein Met is Al, Mg, Ti, B, Ga, Si, Mn or Co; Met' is Mg, Zn, Al, Ga, B, Zr or Ti; A is Li, Ag, Cu, Na, Mn, Fe, Co, Ni, Cu or Zn; B is Ti, V, Cr, Fe or Zr; X is P, S, Si, W or Mo; and wherein $0 \le x \le 0.3$, $0 \le y \le 0.5$, $0 \le z \le 0.5$, $0 \le x' \le 0.4$, $0 \le \alpha \le 1$, $0 \le \beta \le 1$, $0 \le \gamma \le 1$, $0 \le \delta \le 0.4$, $0 \le z' \le 0.4$ and $0 \le h' \le 3$.

19. The device of claim 17, wherein the anode comprises lithium metal, graphitic material, amorphous carbon, $Li_4Ti_5O_{12}$, tin alloy, silicon, silicon alloy, intermetallic compound, or any mixtures thereof.

20. The device of claim 16, wherein the anode is a composite anode comprising an active material silicon or silicon alloy and a conductive polymer coating around the active material.

21. The device of claim 20, wherein the conductive polymer is polyacrylonitrile (PAN).

22. The device of claim 16, wherein the device comprises a lithium battery, lithium-ion battery, lithium-sulfur battery, lithium-air battery, sodium ion battery, magnesium battery, lithium/MnO2 battery, or Li/poly(carbon monofluoride) battery.

23. The device of claim 16, wherein the device comprises a capacitor or solar cell.

24. The device of claim 16, wherein the device comprises an electrochemical cell.

25. The device of claim 16, wherein the separator comprises a porous separator separating the anode and cathode from each other.

26. The device of claim 25, wherein the porous separator comprises an electron beam-treated micro-porous polyolefin separator or a microporous polymer film comprising nylon, cellulose, nitrocellulose, polysulfone, polyacrylonitrile, polyvinylidene fluoride, polypropylene, polyethylene, polybutene, or co-polymers or blends of any two or more such polymers.

27. The device of claim 16, wherein the aprotic organic solvent system comprises an open-chain or cyclic carbonate, a carboxylic acid ester, a nitrile, an ether, a sulfone, a ketone, a lactone, a dioxolane, a glyme, a crown ether, a siloxane, a phosphoric acid ester, a phosphite, a mono- or polyphosphazene, or any mixture thereof.

28. The device of claim 16, wherein the aprotic organic solvent system is present in the electrolyte in a range of from 60 wt. % to 90 wt. % of the electrolyte.

29. The device of claim 16, wherein a cation component of the metal salt is an alkali metal.

30. The device of claim 29, wherein the alkali metal is lithium or sodium.

31. The device of claim 16, wherein a cation component of the metal salt is aluminum or magnesium.

32. The device of claim 16, wherein the metal salt is present in the electrolyte in a range of from 10 wt. % to 30 wt. % of the electrolyte.

33. The device of claim 16, wherein the electrolyte further comprises at least one second additive.

34. The device of claim 33, wherein the second additive comprises a sulfur-containing compound, a phosphorus-containing compound, a boron-containing compound, a silicon-containing compound, a fluorine-containing compound, a nitrogen-containing compound, a compound containing at least one unsaturated carbon-carbon bond, a carboxylic acid anhydride, or any mixtures thereof.

35. The device of claim 33, wherein the second additive comprises a partially or fully halogenated phosphoric acid ester compound, an ionic liquid, or mixtures thereof.

36. The device of claim 35, wherein the second additive comprises a halogenated phosphoric acid ester compound and the halogenated phosphoric acid ester compound is 4-fluorophenyldiphenylphosphate, 3,5-difluorophenyldiphenylphosphate, 4-chlorophenyldiphenylphosphate, trifluorophenylphosphate, heptafluorobutyldiphenylphosphate, trifluoroethyldiphenylphosphate, bistrifluoroethylphenyl phosphate, or phenylbis(trifluoroethyl)phosphate.

37. The device of claim 35, wherein the second additive comprises an ionic liquid and the ionic liquid is tris(N-ethyl-N-methylpyrrolidinium)thiophosphate bis(trifluoromethylsulfonyl)imide, tris(N-ethyl-N-methylpyrrolidinium) phosphate bis(trifluoromethylsulfonyl)imide, tris(N-ethyl-N-methylpiperidinium)thiophosphate bis(trifluoromethylsulfonyl)imide, tris(N-ethyl-N-methylpiperidinium)phosphate bis(trifluoromethylsulfonyl)imide, N-methyl-trimethylsilylpyrrolidinium bis(trifluoromethylsulfonyl)imide, or N-methyl-trimethylsilylpyrrolidinium hexafluorophosphate.

38. The device of claim 33, wherein the second additive is present in the electrolyte in a range of from 0.01 wt. % to 10 wt. % of the electrolyte.

\* \* \* \* \*